United States Patent
Stuber et al.

(10) Patent No.: US 6,948,019 B2
(45) Date of Patent: Sep. 20, 2005

(54) APPARATUS FOR ARBITRATING NON-QUEUED SPLIT MASTER DEVICES ON A DATA BUS

(75) Inventors: Russell B. Stuber, Boulder, CO (US); Robert W. Moss, Longmont, CO (US); David O. Sluiter, Superior, CO (US)

(73) Assignee: LSI Logic Corporation, Milpitas, CA (US)

( * ) Notice: Subject to any disclaimer, the term of this patent is extended or adjusted under 35 U.S.C. 154(b) by 421 days.

(21) Appl. No.: 10/137,459

(22) Filed: Apr. 30, 2002

(65) Prior Publication Data

US 2003/0204663 A1 Oct. 30, 2003

(51) Int. Cl.[7] .......................... G06F 12/00; G06F 13/14; G06F 13/38
(52) U.S. Cl. ....................... 710/240; 710/107; 710/112; 710/113; 710/309; 710/36; 710/311; 710/241
(58) Field of Search ............................... 710/107, 112, 710/113, 309, 36, 311, 240, 241

(56) References Cited

U.S. PATENT DOCUMENTS

| 5,132,680 | A | | 7/1992 | Tezuka et al. | |
|---|---|---|---|---|---|
| 5,257,356 | A | * | 10/1993 | Brockmann et al. | 710/110 |
| 5,345,562 | A | * | 9/1994 | Chen | 710/110 |
| 5,524,263 | A | | 6/1996 | Griffth et al. | |
| 5,535,340 | A | | 7/1996 | Bell et al. | |
| 5,579,492 | A | * | 11/1996 | Gay | 710/110 |
| 5,621,897 | A | * | 4/1997 | Boury et al. | 710/116 |
| 5,796,413 | A | | 8/1998 | Shipp et al. | |
| 5,845,097 | A | * | 12/1998 | Kang et al. | 710/117 |
| 5,931,924 | A | * | 8/1999 | Arimilli et al. | 710/41 |
| 5,943,483 | A | * | 8/1999 | Solomon | 710/107 |
| 5,944,805 | A | * | 8/1999 | Ricks et al. | 710/107 |
| 5,961,621 | A | | 10/1999 | Wu et al. | |
| 5,996,036 | A | * | 11/1999 | Kelly | 710/110 |
| 6,052,763 | A | * | 4/2000 | Maruyama | 711/152 |
| 6,076,125 | A | * | 6/2000 | Anand | 710/107 |
| 6,092,141 | A | | 7/2000 | Lange | |
| 6,141,715 | A | * | 10/2000 | Porterfield | 710/113 |
| 6,147,926 | A | | 11/2000 | Park | |
| 6,154,800 | A | * | 11/2000 | Anand | 710/107 |
| 6,216,190 | B1 | | 4/2001 | Chin et al. | |
| 6,397,279 | B1 | * | 5/2002 | Jaramillo et al. | 710/110 |

(Continued)

FOREIGN PATENT DOCUMENTS

| EP | 720099 A1 | * | 7/1996 | ........... G06F/13/36 |
|---|---|---|---|---|
| EP | 737924 A2 | * | 10/1996 | ......... G06F/13/362 |
| WO | WO 9635175 A2 | * | 11/1996 | ......... G06F/13/364 |

OTHER PUBLICATIONS

"Method to Improve Performance of Split–read Transactions," Oct. 1, 2000, IBM Technical Disclosure Bulletin, Issue 438, p. 1871.*

"AMBA™ Specification (Rev. 2.0)", ARM Limited, Cambridge, England, pp. ii–vi and 3–1–3–58 (May 13, 1999).

* cited by examiner

Primary Examiner—Glenn A. Auve
Assistant Examiner—Donna K. Mason
(74) Attorney, Agent, or Firm—Westman, Champlin & Kelly

(57) ABSTRACT

A slave device on a data bus has a register that stores a non-queued split master vector containing bits identifying whether a transaction with corresponding master devices have been split. An input gate is responsive to the status of the slave device and to receipt of a command from a master device when the slave device status is busy to set a bit in the non-queued split master vector identifying that the transaction with the corresponding master device is split. An output gate is responsive to a not busy status of the slave device to output the non-queued split master vector to the arbiter to re-arbitrate use of the data bus among the previously-split non-queued master devices.

10 Claims, 2 Drawing Sheets

U.S. PATENT DOCUMENTS

| | | | |
|---|---|---|---|
| 6,442,642 B1 * | 8/2002 | Brooks | 710/305 |
| 6,493,776 B1 * | 12/2002 | Courtright et al. | 710/110 |
| 6,587,905 B1 * | 7/2003 | Correale et al. | 710/107 |
| 6,598,104 B1 * | 7/2003 | Jaramillo et al. | 710/110 |
| 6,604,159 B1 * | 8/2003 | Thekkath et al. | 710/110 |
| 6,633,944 B1 * | 10/2003 | Holm et al. | 710/306 |
| 6,681,283 B1 * | 1/2004 | Thekkath et al. | 710/305 |
| RE38,428 E * | 2/2004 | Kelly et al. | 710/110 |
| 6,697,904 B1 | 2/2004 | Bennett | |
| 6,732,208 B1 * | 5/2004 | Alsaadi et al. | 710/112 |
| 6,772,254 B2 * | 8/2004 | Hofmann et al. | 710/110 |
| 2002/0062414 A1 * | 5/2002 | Hofmann et al. | 710/110 |
| 2002/0147871 A1 * | 10/2002 | Koike | 710/107 |
| 2003/0065844 A1 | 4/2003 | Lester et al. | |
| 2003/0065847 A1 * | 4/2003 | Goodrum et al. | 710/113 |
| 2004/0114454 A1 * | 6/2004 | Farmwald et al. | 365/233 |

\* cited by examiner

APPARATUS FOR ARBITRATING NON-QUEUED SPLIT MASTER DEVICES ON A DATA BUS

FIELD OF THE INVENTION

This invention relates to data buses, and particularly to controls for data buses used in integrated circuit chips and the like.

BACKGROUND OF THE INVENTION

Data buses are used in integrated circuits (ICs) to transfer data between master devices, such as user-controlled microprocessors, and slave devices that control peripheral devices, such as a memories or the like. To avoid overlapping data messages that may lead to error in data transmission between the master and slave devices, it is common to employ an arbiter to arbitrate message traffic on the bus. One such bus design is an Advanced High-performance Bus (AHB) from ARM Limited of Cambridge, England. The AHB bus design is a form of an Advanced Microcontroller Bus Architecture (AMBA) bus. The AHB bus provides high performance, high clock frequency data transfer between multiple bus master devices and multiple bus slave devices through use of an arbiter. The AHB bus is particularly useful in integrated circuit chips, including single chip processors, to couple processors to on-chip memories and to off-chip external memory interfaces.

Many bus designs, including the AHB bus, employ a split technique whereby a slave device that cannot handle a command from a master device within some implementation-specific criterion delays the data transfer phase. Rather than hold the bus in a busy state until the slave device is ready to perform the transaction, the slave device may issue a split, so that the arbiter blocks the requesting master device from use of the bus and releases the bus for use by other master devices. When the given slave device becomes ready to perform the task, it releases the master and the arbiter re-arbitrates the master for use of the bus. Eventually, the formerly split master device will gain access to the bus to complete the data transfer.

One problem of data bus systems employing split techniques is that when the slave device has become ready to receive further commands, it releases only the master device whose command is first, or oldest, in the slave device input command queue. If other master devices whose transactions have been split by the slave device have a higher priority in the arbitration protocol than the master device being released, they must nevertheless wait until the slave device releases them, usually after the lower-priority master device has completed its transaction.

SUMMARY OF THE INVENTION

The present invention is directed to a split technique whereby the slave device notifies the arbiter to arbitrate access among all non-queued master devices that have been split. The arbiter protocol is altered by the release to arbitrate among those non-queued master devices that had been split. If several non-queued master devices were blocked due to splits, the arbiter modifies its arbitration protocol to arbitrate access among those master devices.

In preferred embodiments of the present invention, a register stores identifications of master devices whose transactions with a slave device have been split. An input gate is responsive to the status of the slave device and to receipt of a command from a master device when the slave device status is busy to insert an identification of the master device into the register. The register stores a split master vector having at least as many bits as the number of master devices on the bus system, and the input gate includes an input vector generator that generates an input vector having at least as many bits as the number of master devices on the bus system. The input vector generator is responsive to a command from a master device for setting a bit in the input vector having a bit corresponding to the split master device. The input gate is to a busy status of the slave device to combine the input vector with the split master vector. An output gate outputs the split master vector when the status of the slave device is not busy.

DETAILED DESCRIPTION OF THE PREFERRED EMBODIMENTS

Figure 1:
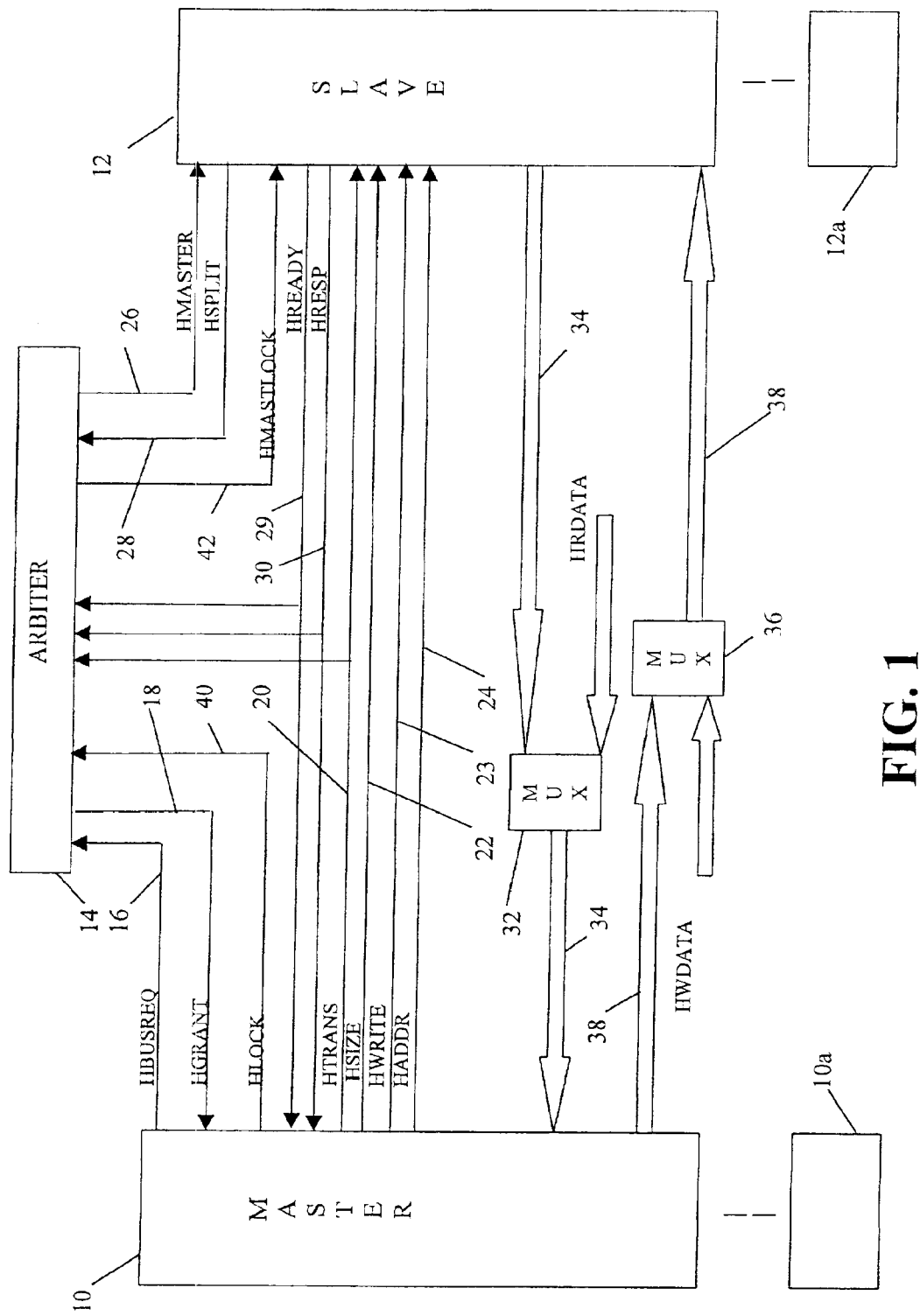
FIG. 1 is a block diagram of portions of a bus, illustrating a split control according to the present invention.

FIG. 1 illustrates portions of an Advanced High-performance Bus (AHB) design of an Advanced Microcontroller Bus Architecture (AMBA) bus from ARM Limited of Cambridge, England containing features of the present invention. A more detailed description of the AHB bus design may be found in *AMBA Specification* published by ARM Limited of Cambridge, England (1999), and particularly Chapter 3 thereof (pp. 3-1 to 3-58), incorporated herein by reference. This bus provides high performance, high clock frequency transfer between multiple bus master devices 10, 10a, etc. and multiple bus slave devices 12, 12a, etc., and is particularly useful in microprocessor chips, including single chip processors.

A master device 10 is a device that is capable of initiating a data transfer with a slave device 12 by providing address and control information. Examples of operations requiring data transfer between master and slave devices include read and write operations to read data from, or write data to, a peripheral memory device operated by the slave device. A slave device 12 is a device that responds to a command to perform the data transfer. The slave device ordinarily provides a return indicating the success, failure or waiting status of the data transfer.

In the bus illustrated in FIG. 1, data transfer operations between the master and slave devices are arbitrated by an arbiter 14, which is a device that ensures that only one master device 10 is allowed to initiate data transfers at a given time. The arbiter operates in accordance with an arbitration protocol that establishes a priority among the master devices, such as by an assigned rank or an allocation scheme based on usage.

One feature of the bus illustrated in FIG. 1 is the ability of certain slave devices 12 to initiate a split of a transfer request from a master device 10. More particularly, when a slave device is not ready to respond to the master device command, it may issue a stall or a split. A stall will hold the bus for the transaction with the master device so that no other traffic is permitted. A split will block the master device from the bus and idle the bus so that it becomes available to other master devices. Thus, a stall holds the bus busy, whereas a split releases the bus for use by other master devices. Splits are issued in response to implementation-specific conditions, such as where the slave device decides that the transfer will require a large number of cycles to complete or where the slave device is unable to process multiple transfer requests concurrently.

If the slave device issues a split, the requesting master device is blocked from use of the bus and the bus is idled for use by other master devices. When the slave device becomes ready to handle a request from a master device, it releases one or more of the splits so that that previously-split master device can be granted access to the bus.

Split transfers improve the overall utilization of the bus by separating, or splitting, the operation of the master device 10 providing the address to a slave device 12 from the operation of the slave device. Thus, with a split operation, the slave device can delay a master device from access to the bus until the slave device is ready to respond to the command.

A split initiated by slave device 12 causes arbiter 14 to mask off the master device 10 which issued the command from access to the bus. The split also idles the bus for use by other master devices. When slave device 12 is ready to handle the master device request, it notifies arbiter 14 that it is ready and the arbiter unmasks the affected master device 10 so that the master device can be granted access to the bus in accordance with the arbitration protocol of the arbiter. Upon re-arbitration and re-grant, the master device re-issues the command that had been split to the slave device.

In operation of the data bus system shown in FIG. 1, arbiter 14 is configured to receive an HBUSREQ signal via an individual line 16 from a respective master device 10, indicating that the respective master device 10 seeks access to the data bus. Arbiter 14 responds to the requests in an order established by its protocol, as modified by any split or retry operation, to issue an HGRANT signal via a respective line 18 to one of the requesting master devices. If, for example, there are sixteen master devices, there will be sixteen lines 16 on which each respective master device 10 notifies arbiter 14 that the respective master device desires use of the bus and there will be sixteen lines 18 on which access is granted. The arbiter protocol grants access to one and only one master device at a time.

When access is granted to a master device 10, the address phase commences with the requesting master device 10 sending each slave device 12 an HTRANS signal via bus 20, an HSIZE signal via bus 22, an HWRITE signal via bus 23 and an HADDR signal via bus 24. The HTRANS signal is also sent to arbiter 14. In addition, the master device sends an HLOCK signal to the arbiter. The HWRITE signal is a single bit representing whether the master device is requesting a read or a write operation; the HSIZE signal is a 3-bit code representing the size of the transfer; the HADDR signal is a 32-bit code representing the address of the location in a slave device where data are to be read or written; the HTRANS signal is a 2-bit code identifying the type of transfer (e.g., sequential, non-sequential, idle or busy); and the HLOCK signal is a bit indicating whether or not the master is performing a series of indivisible (locked) transactions.

Arbiter 14 asserts a master identification code, or tag, via bus 26 identifying the master device that is using the bus. This tag is sent to all of the slave devices via bus 26. In the case of a system with sixteen master devices, the master identification code is a 4-bit code representing the individual master device. Arbiter 14 also asserts an HMASTLOCK bit indicating that the transfer is or is not part of a locked transaction.

Each master transaction (HTRANS) on bus 20 generates a response from one of the slave devices 12, namely the slave device containing the address where the data are to be read or written. The response appears on buses 29 and 30 as a 1-bit HREADY signal and a 2-bit HRESP signal. For example, an OKAY response occurs when HRESP is OKAY (HRESP=(0,0) and HREADY is asserted (HREADY=1). A STALL response occurs when HRESP is OKAY and HREADY is de-asserted (HRESP=(0,0) and HREADY=0). A SPLIT response is a two-cycle response that during the first cycle HRESP is SPLIT (HRESP=(1,1)) and HREADY is de-asserted (HREADY=0) and during the second cycle HRESP remains SPLIT and HREADY is asserted (HRESP=(1,1) and HREADY=1).

The OKAY response (HRESP=(0,0) and HREADY=1) indicates that the previous command has been completed, for example that the write command and data transfer were accepted by the slave device or that read data are available on the HRDATA bus 34. The STALL response (HRESP=(0,0) and HREADY=0) indicates that the slave device is not ready to provide a response. The slave device may hold HREADY low (HREADY=0) as long as it desires, but arbiter 14 cannot permit any bus traffic as long as HREADY is low, and the results of the prior transfer may not be known. The first cycle of the SPLIT response (HRESP=(1,1) and HREADY=0) causes arbiter 14 to mask off the master device from use of the bus, and the second cycle of the SPLIT response (HRESP=(1,1) and HREADY=1) idles the bus for use by other master devices.

Upon receipt of a command from a master device, the slave device records the bus master number in a master ID queue. If the slave device decides it will handle the transaction it issues an OKAY response on HRESP bus 30. If the command is a write command, or if it is a read command and the read data are available on HRDATA bus 34, the slave device also asserts a bit on the HREADY bus 29 (HREADY=1) and the transaction is completed. Otherwise, the slave device de-asserts the HREADY bus 30 (HREADY=0) to STALL the bus. When read data become available on HRDATA bus 34, slave device 12 asserts a bit on HREADY bus 29 and the transaction is completed.

If the slave device decides it is not ready to handle the transaction, it issues a SPLIT response on HREADY bus 30 and HRESP bus 29 to mask the master device from the bus and idle the bus. Later, when the slave device becomes free to accept a command, it asserts a bit on HSPLIT bus 28 to unmask the split master device.

Bus 28 comprises the same number of lines as there are master devices 10, with one line dedicated for each master device. In the prior AHB bus, when slave device 12 is ready to accept a command, it asserts a bit on the HSPLIT line 28 corresponding to the master device 10 that it had split, thereby unmasking that master device so that it may access the bus. Arbiter 14 eventually re-arbitrates the previously masked master device in accordance with its protocol. On re-arbitration, the master device will eventually be granted access to the bus to re-issue the command and retry the transfer.

The basic stages of a split transaction of an operation are as follows:

1. The master device 10 starts the transfer in an identical way to any other transfer and issues address and control information.
2. If the slave device 12 is able to provide data for a read immediately it may do so. If the slave device decides that it may take a number of cycles to obtain the data or otherwise honor the command, it may give a split response via buses 29 and 30. During every transfer arbiter 14 broadcasts a number, or tag, showing which master device 10 is using the bus. The slave device 12 that can perform the command records the number, to use it to restart the transfer at a later time.

3. The arbiter masks off the split master device and arbitrates the other master devices for use of the bus. The action of the split response allows bus master device handover to occur.
4. When the slave device 12 is ready to complete the transfer, it asserts a bit on the appropriate line of HSPLIT bus 28 to the arbiter 14 to indicate which master device 10 should be re-arbitrated access to the bus.
5. When the bit is asserted on HSPLIT bus 28, arbiter 14 restores the priority of that master device.
6. Eventually, the arbiter will grant the master device use of the bus so it can re-issue the command and re-attempt the transfer. This may not occur immediately if a higher priority master is using the bus.
7. When the transfer eventually takes place, the slave finishes with an OKAY response (HRESP=(0,0) and HREADY=1) via buses 29 and 30.

As shown in FIG. 1, actual transfer of data is performed directly between the slave device 12 and master device 10. A read transfer occurs when the slave device receives the master identification tag via bus 26 for the master device 10 for which it has retrieved data. At that time, the correct master device 10 has been granted access to the bus and the transfer takes place through multiplexer 32 on bus 34 to the correct master device. During the transfer, the slave device 12 issues an OKAY response on buses 29 and 30 notifying the arbiter and master device that the transfer has successfully occurred.

In some cases, the master device 10 may assert an HLOCK signal on bus 40 to indicate to arbiter 14 that the master device is performing several indivisible transfers and that the arbiter must not grant any other master device access to the bus once the locked transfer commences. The arbiter indicates that a current transfer is part of a locked sequence by asserting an HMASTLOCK signal on bus 42 to slave device 12. The slave device responds to the signal on bus 42 to process all locked transfers before any other master device is granted access to the bus.

Figure 2:
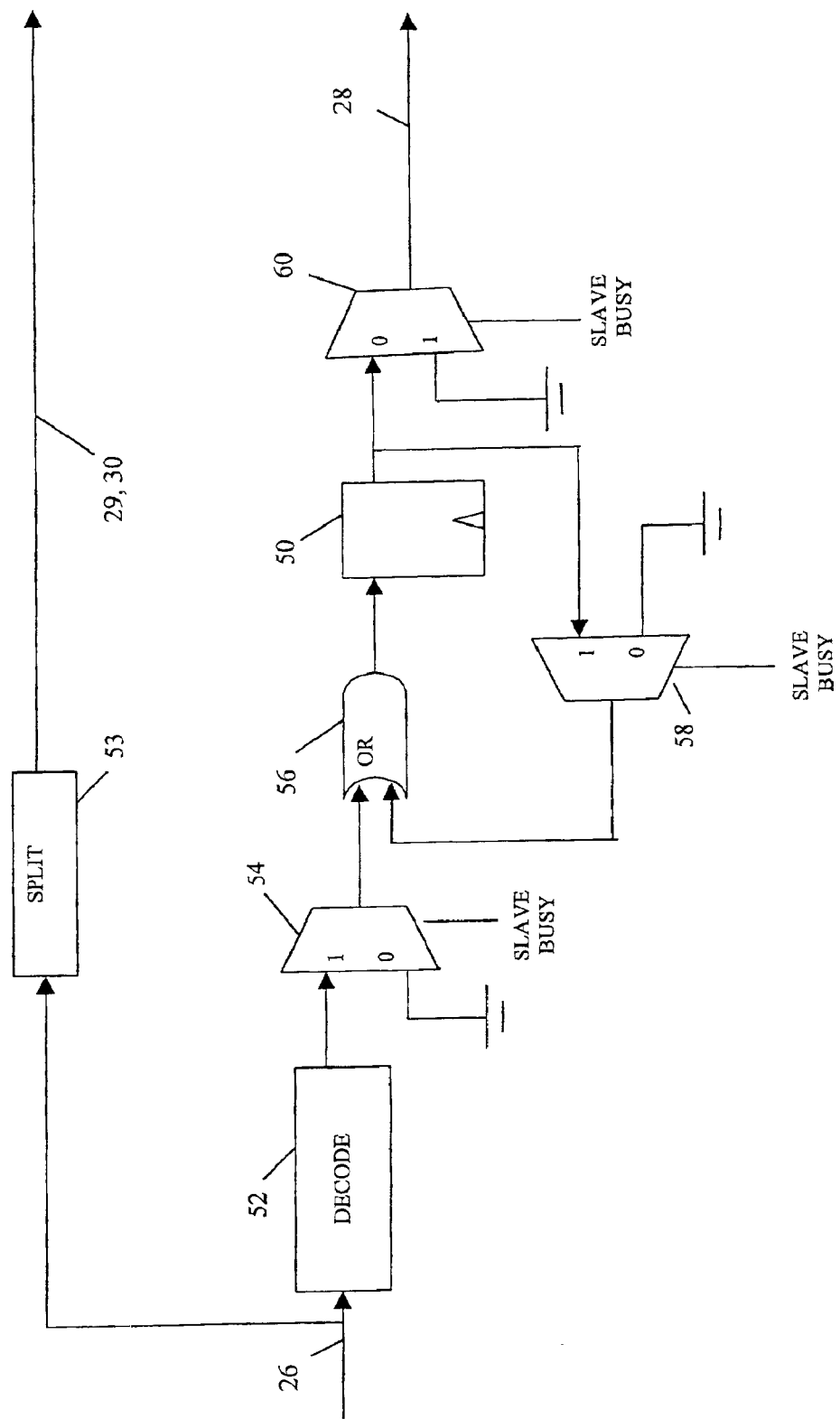
FIG. 2 is a functional block diagram of a portion of a slave device for use in the bus illustrated in FIG. 1.

FIG. 2 is a block functional diagram of an input command portion of a slave device 12 for notifying arbiter 14 of the identification of all non-queued master devices 10 that are currently split by the slave device. Arbiter 14 is then able to use that information to re-arbitrate all of those non-queued master devices whose requests had been split by the slave device. Rearbitration is performed among the previously-split non-queued master devices, together with the master devices that had not been split.

Register 50 contains a non-queued split master vector identifying the master devices whose transactions have been split, but not queued, by the slave device. The vector is a bit vector containing the same number of bits as there are master devices in the bus system. For example, if the bus system includes sixteen master devices 10, the vector has sixteen bits and register 50 is capable of storing at least sixteen bits. The state of each bit indicates whether a transaction with the corresponding master device has been split by the slave device. For example a bit value of "1" might indicate that a transaction with the corresponding master device has been recently split by the slave device (i.e., since the last split release event), whereas a "0" bit might indicate that no split transactions are pending with the master device.

Upon receipt of a command by the slave device, the 4-bit master identification code (HMASTER) on line 26 associated with the command is decoded by decoder 52 to supply a bit vector to gate 54. If the slave device 12 is not busy, the slave device operates in the normal manner to service the request and complete the transaction, or issue a split signal through split control 53 onto bus 28 indicative that the slave device cannot queue the command. If the slave device is busy, the slave device also generates a "slave busy" signal. Gate 54 is enabled by the slave busy signal to insert the bit from the bit vector decoded by decoder 52 into the non-queued split master vector in register 50.

For example, if the slave device is busy and there are no outstanding master device transactions split by the slave device, the vector in register 50 might initially be a string of sixteen 0s, "0000000000000000". A command from the fourth master device (having an identification code "0011") will be decoded by decoder 52 to generate a bit vector of "0000000000001000". OR gate 56 receives the bit vector from gate 54 and the present non-queued split master vector from register 50 to insert a "1" bit into the non-queued split master vector at the fourth position, "0000000000001000" and reload the updated non-queued split master vector into register 50. At the same time, split control 53 is operated to split the master device in the usual manner.

The vector in register 50 is created employing the bit vector generated by decoder 52, the existing vector in register 50 and gates 54, 56 and 58. More particularly, with the slave busy signal high, gate 54 passes the bit vector from decoder 52 to a first input of OR gate 56. Gate 58 passes the non-queued split master vector from register 50 to the other input of OR gate 56. OR gate 56 combines the two vectors on a bit-by-bit basis, and inserts the result into register as a new non-queued split master vector. Thus, the vector in register 50 will appear as "0000000000001000" for the example. If another master device command is received while the slave device is still busy, another bit is inserted into the non-queued split master vector in the same manner.

The non-queued split master vector in register 50 identifies all master devices whose transactions have been split, but not queued by the busy slave device. When the slave device becomes idle (no longer busy), the "slave busy" enable signal will go low, so no bits for additional master devices will be added to the vector. Moreover, gate 60 is enabled by the low "slave busy" signal to assert the non-queued split master vector onto line 28 for the HSPLIT signal. In the prior AHB bus, there is a separate line 28 for each master device and the HSPLIT signal will appear on only that line 28 corresponding to the oldest split master device. With the present invention, instead of being a single free bit, as in the prior AHB bus, the HSPLIT signal is a multi-bit vector identifying all non-queued master devices that had been split. The multi-bit vector is applied to all of the lines 28, as a multi-bit bus, not just the line 28 corresponding to the oldest split master device, so that the arbiter receives a free bit for each previously-split non-queued master device.

Arbiter 14 is responsive to the non-queued split master vector to unmask, and thus free, all of the master devices identified in the vector. Thus, the vector serves to add the non-queued split master devices to the arbitration protocol. The arbiter applies its protocol to the master devices identified in the vector so that those master devices can be rearbitrated with the master devices that had not been split. The arbitration protocol used may be the same as the general protocol, to arbitrate among those master devices identified in the non-queued split master vector and any other non-split master devices.

The present invention thus provides a technique such that when the slave device becomes available to perform a transfer with a master device, all of the non-queued master devices whose transactions were split by the slave device are arbitrated for use of the bus.

One feature of the invention is that it may be applied to existing AHB bus hardware without significant modification. More particularly, the invention employs the additional 16-bit registers 50 and 52 and gates 54, 56, 58, and 60, representing minimal addition to the slave device IC chip. With the invention, the arbiter is modified to respond to the 16-bit split master vector to provide a modified protocol for re-arbitration of the previously-split master devices.

Although the present invention has been described with reference to preferred embodiments, workers skilled in the art will recognize that changes may be made in form and detail without departing from the spirit and scope of the invention.

What is claimed is:

1. Apparatus for identifying master devices whose transactions with a slave device have been split by the slave device in a data bus system for transferring data between the slave device and respective ones of a plurality of master devices, the apparatus comprising:

a register for storing a split master vector identifying those master devices of the plurality of master devices whose transactions have been split by the slave device, the split master vector having at least as many bits as the number of master devices on the bus system;

an input vector generator generating an input vector having at least as many as the number of master devices on the bus system, the input vector generator being responsive to a command from one of the plurality of master devices for generating an input vector having a bit corresponding to the one master device indicative of a split transaction, and a input gate responsive to a busy status of the slave device to combine the input vector with the split master vector.

2. Apparatus according to claim 1, wherein the input gate includes:

an OR gate for adding the input vector to the split master vector on a bit-by-bit basis and storing the added result to the register.

3. Apparatus according to claim 2, further including:

an output gate responsive to the split master vector to output the split master vector when the status of the slave device is not busy.

4. Apparatus according to claim 1, further including:

an output gate responsive to the split master vector to output the split master vector when the status of the slave device is not busy.

5. Apparatus for managing arbitration of a data bus among a plurality of master devices coupled to the data bus and capable of initiating transactions with at least one slave device coupled to the data bus by issuing commands to the slave device, the slave device being operable to initiate a split of a transaction with one of the plurality of master devices in response to a command and operable to release the split, the apparatus comprising:

a register for storing a split master vector identifying those master devices of the plurality of master devices whose transactions have been split by the slave device, the split master vector having at least as many bits as the number of master devices on the bus system;

an input vector generator generating an input vector having at least as many bits as the number of master devices on the bus system, the input vector generator being responsive to a command from one of the plurality of master devices for generating an input vector having a bit corresponding to the one master device indicative of a split transaction;

an input gate responsive to a busy status of the slave device to combine the input vector with the split master vector; and an arbiter coupled to the plurality of master devices and the slave device to arbitrate use of the data bus among the plurality of master devices, the arbiter being responsive to the input gate to deny use of the data bus to the one master device and to re-arbitrate use of the data bus among the indentified master devices upon release of the split.

6. Apparatus according to claim 5, wherein the input gate includes:

an OR gate for adding the input vector to the split master vector on a bit-by-bit basis and storing the added result to the register.

7. Apparatus according to claim 6, further including:

an output gate responsive to the split master vector to output the split master vector when the status of the slave device is not busy.

8. Apparatus according to claim 7, wherein the arbiter is responsive to the split master vector to arbitrate use of the data bus among the master devices identified in the split master vector.

9. Apparatus according to claim 5, further including:

an output gate responsive to the split master vector to output the split master vector when the status of the slave device is not busy.

10. Apparatus according to claim 9, wherein the arbiter is responsive to the split master vector to arbitrate use of the data bus among the master devices identified in the split master vector.

* * * * *